June 22, 1948.  H. E. WINKLER ET AL  2,443,942
FEED SCREW FOR STOKERS
Filed Oct. 27, 1945
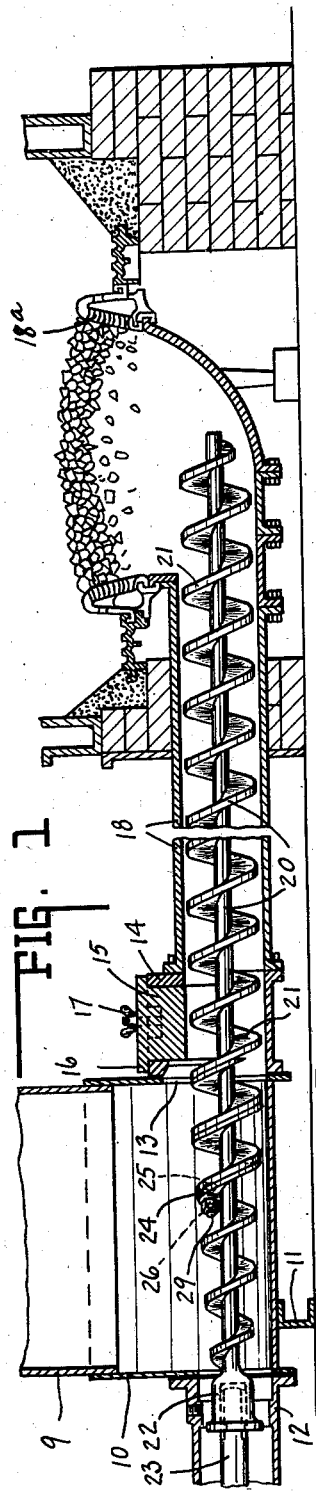
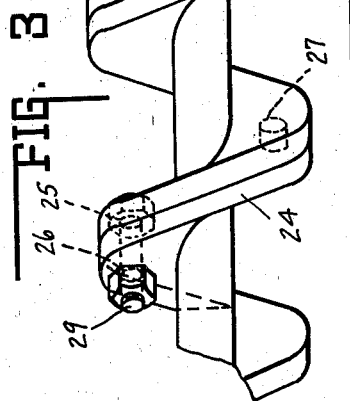
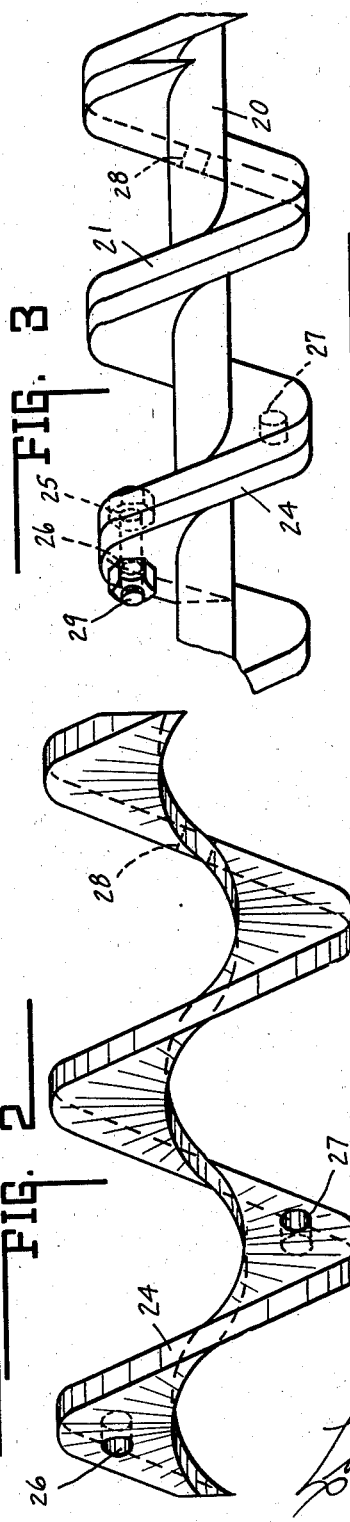
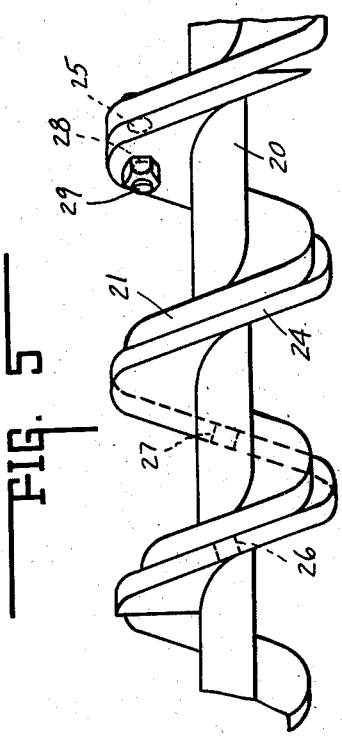
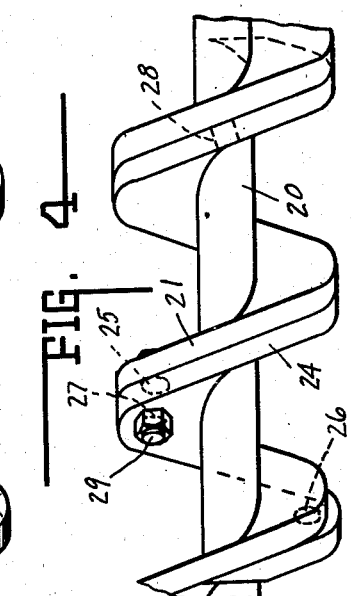
INVENTORS.
HERMAN E. WINKLER.
FRANCIS E. BOYER.
BY
Lockwood, Goldsmith & Galt,
ATTORNEYS.

Patented June 22, 1948

2,443,942

UNITED STATES PATENT OFFICE 2,443,942

FEED SCREW FOR STOKERS

Herman E. Winkler, Lebanon, Ind., and Francis E. Boyer, East Grand Rapids, Mich., assignors to U. S. Machine Corporation, Lebanon, Ind., a corporation Application October 27, 1945, Serial No. 624,992

5 Claims. (Cl. 198—213)

This invention relates to a feed screw for stokers wherein solid fuel, such as coal, is screw fed from a hopper through a conduit into a retort, and particularly to a variable metering screw for controlling the feed rate per screw revolution in accordance with the character and requirements of the fuel.

In stokers employing feed screws, the problems of starving the feed screw, which if done to excess may lead to smoke back, and over feeding, which if excessive may lead to packing in the feed tube, and thereby locking of the feed screw, are presented. These problems are affected by the degree of coarseness of the solid fuel being fed, by the length of the feed screw, or both. Thus, wherein the metering capacity of the screw is fixed by the pitch and space between the turns of the flight, the screw may meter properly for one coarseness of coal, and feed screw length, but improperly in respect to others. For example, in a screw having a fixed flight of predetermined capacity and diameter in the hopper, an over-supply of coal might be received and fed into the feed tube if the coal is fine, resulting in packing and feed screw lockage, whereas with exceedingly coarse coal the screw might not be sufficiently filled to offer adequate resistance to prevent the flow of gases from the retort back through the feed tube and hopper into the atmosphere. Thus, with the same feed screw, coal can cause undue packing if extremely fine, and if extremely coarse cause excessive starving and permitting smoke back through the hopper.

For conveniently and adjustably controlling the metering capacity within the hopper to attain the desired feed for varying coarseness of coal and varying feed screw length through the feed conduit to the retort, an auxiliary metering flight is adjustably mounted in association with a fixed flight provided on the fixed screw adjacent the outlet portion of the hopper leading to the feed conduit. By simple adjustment of the auxiliary metering flight relative to the fixed flight of the screw, varying metering characteristics are obtained, suitable for the varying requirements of coals and lengths.

The full nature of the invention will be understood from the accompanying drawings and the following description and claims:

Fig. 1 is a central vertical section through the hopper base and a portion of the feed conduit leading to the retort, and showing the feed screw in elevation with the auxiliary metering flight positioned therein.

Fig. 2 is an elevational view of the auxiliary metering flight.

Fig. 3 is an elevational view showing a section of the feed screw with the metering flight in one position.

Fig. 4 is the same as Fig. 3 showing the metering flight in a second position.

Fig. 5 is the same as Fig. 4, showing the metering flight in a third position.

In the drawings there is shown in a stoker construction, a hopper 9 having a base 10 of the usual character for receiving solid fuel, such as coal. Said base is mounted upon a supporting beam 11 and has secured at the end thereof remote from the discharge, a housing 12 leading to the driving mechanism for the feed screw. The discharge end of the hopper base is apertured at 13, opening into a crusher block housing 14 having a crusher block 15 associated with a removable cover plate 16 provided with a securing wing bolt 17. Communicating with the crusher block housing and secured to the feeding end thereof there is a feed conduit 18 leading to the usual stoker retort 18a.

Extending through the lower portion of the hopper base, the crusher block housing and feed conduit, there is a feed screw 20 having a spiral cast flight 21 of a predetermined thickness, diameter and pitch. The rear or driving end of the feed screw is formed with a socket 22 for receiving a driving shaft 23 driven from any suitable source of power, as is well understood. The forward or feeding end of the screw terminates in association with the retort 18a to be fed in the customary manner.

As shown herein, the first turn of the flight adjacent the discharge aperture 13 of the hopper base is of the same diameter and pitch as the screw flight leading through the feed conduit 18. However, rearwardly thereof and extending toward the remote or far end of the hopper base the feed screw is tapered wherein the diameter of the flight is gradually reduced in diameter to reduce re-circulation.

For varying the coal receiving or metering capacity of the feed screw relative to its feed, the distance between turns of the flight at the discharge end of the hopper base is reduced throughout a varying extent of that critical portion of the screw leading from the hopper to the crusher block 15. This is accomplished by providing an auxiliary metering flight 24 shown in Fig. 2, which comprises an auxiliary flight of the same pitch and diameter as the last turn of the fixed flight 21.

The metering flight is carried by the screw shaft 20 in association with the fixed flight thereof, but is adjustable longitudinally of the screw by relative rotation therewith. For securing the metering flight in adjusted position, the second turn of the fixed flight from the crusher block is provided with an aperture, indicated at 25, for registry with one of these corresponding apertures indicated at 26, 27 and 28 in the metering flight. Said flights are secured together by a bolt and nut 29, clamping them through said apertures when aligned.

When the metering flight is in its forwardmost position, as shown in Fig. 1, it is secured to the flight 21 through the apertures 25, 26. In this position, due to the taper of the fixed metering screw, its metering capacity is at a minimum, resulting in maximum starving of the feed screw. This position is suitable for fine coal. Thus, a less amount of coal is fed from the hopper base to the feed conduit than the capacity thereof and the feed screw operated therethrough.

Wherein the coal to be fed is of normal character, the bolt and nut 29 are removed and the metering flight 24 is revolved about the shaft 20 to bring the second aperture 27 thereof in registry with the aperture 25 of the fixed flight, as shown in Fig. 4. If the coal is very coarse, through the same procedure the metering flight may be adjusted to its innermost position about the shaft 20 until the aperture 28 therein is in registry with the aperture 25, as shown in Fig. 5. In all three positions, the metering flight is secured by the bolt and nut 29 extending through the aperture 25 and the respective selected apertures of the metering flight.

In the latter or innermost position of the meterflight, the metering position of the feed screw is increased by reason of the auxiliary metering flight being of greater diameter than the tapered portion of the fixed flight.

The effect of the metering flight in respect to coal receiving and feeding capacity is illustrated in Figs. 3, 4 and 5, wherein the diameter of the fixed flight turns is gradually reduced to provide a taper as compared with the diameter of the turns of the metering flight associated therewith, which are constant and of the maximum diameter of the fixed flight. Thus, wherein the metering flight extends into the hopper base only a short distance as in Fig. 1, the receiving capacity of the screw is substantially normal. In the position of Fig. 4, its metering capacity is further increased, and in its extreme inner position of Fig. 5, its metering capacity is at a maximum. It will also be noted that the combined turns of the auxiliary and fixed flights has the effect of increasing the thickness of the effective joint metering flight, with a corresponding reduction in space therebetween. In this manner the effective metering of coal, ranging from coarse to fine, is obtained to prevent undue packing of the feed screw in the feed tube on the one hand, and smoke back through the hopper on the other.

Wherein there is disclosed by way of illustration herein one arrangement for varying the effective feeding capacity of the screw, it is not intended that the invention be limited to said modification, but may embrace other and equivalent arrangements within the scope of the appended claims.

The invention claimed is:

1. In a stoker having a hopper base for containing a supply of solid fuel and a feed conduit connected with said hopper base, the combination of a feed screw extending through said hopper base and conduit including a rotative shaft and fixed spiral flight of predetermined metering capacity, an auxiliary metering flight corresponding to and nesting with a plurality of turns of said fixed flight within the hopper base, and means for interlocking said auxiliary metering flight with said fixed flight at a selected position relative to the discharge end of said hopper base for varying the fuel metering capacity of said feed screw.

2. In a stoker having a hopper base for containing a supply of solid fuel and a feed conduit connected with said hopper base, the combination of a feed screw extending through said hopper base and conduit including a rotative shaft and fixed spiral flight of predetermined metering capacity, an auxiliary metering flight corresponding to and nesting with a plurality of turns of said fixed flight, said auxiliary metering flight being rotatable about the shaft relative to the fixed flight of said feed screw to be thereby moved longitudinally thereof into and out of said hopper base for varying the fuel metering capacity of said feed screw, and means for securing said auxiliary flight in a selected position relative to said fixed flight.

3. A feed screw for a stoker comprising a rotatable shaft having a fixed spiral flight of predetermined capacity, an auxiliary metering flight corresponding to and nesting with a plurality of turns of said fixed flight adjustable relative thereto, and means for securing said auxiliary flight in a selected position relative to said fixed flight.

4. A feed screw for a stoker comprising a rotatable shaft having a fixed spiral flight of predetermined capacity, said flight having an aperture therein, an auxiliary metering flight corresponding to and nesting with a plurality of turns of said fixed flight to be rotatable relative thereto for longitudinal adjustment thereon, said metering flight being provided with a series of spaced apertures selectively registerable with said aforementioned aperture, and an element extending through said first-mentioned aperture and a registering aperture of said metering flight for interlocking said flights.

5. In a stoker having a hopper base for containing a supply of solid fuel and a feed conduit connected with said hopper base, the combination of a feed screw extending through said hopper base and feed conduit including a rotative shaft and fixed spiral flight, predetermined turns of said flight within said hopper being of progressively less diameter for tapering away from the discharge end of said hopper base, an auxiliary metering flight corresponding in diameter to the maximum diameter of said fixed flight and nesting with a plurality of turns thereof adjacent the discharge end of said hopper base, said auxiliary flight being rotatable thereabout to move longitudinally thereof for varying the fuel metering capacity of said feed screw, and means for interlocking said fixed flight and metering flight in their adjusted relative position.

HERMAN E. WINKLER.
FRANCIS E. BOYER.

REFERENCES CITED

The following references are of record in the file of this patent:

UNITED STATES PATENTS

| Number | Name | Date |
|---|---|---|
| 998,048 | Thomas | July 18, 1911 |
| 1,134,600 | Filson | Apr. 6, 1915 |
| 1,373,748 | Lower | Apr. 5, 1921 |
| 1,553,539 | Kinyon | Sept. 15, 1925 |
| 1,767,248 | Leach | June 24, 1930 |
| 2,118,289 | Birkenbeuel | May 24, 1938 |
| 2,199,770 | Young | May 7, 1940 |
| 2,233,707 | Nelson | Mar. 4, 1941 |
| 2,266,650 | Matheis | Dec. 16, 1941 |
| 2,343,707 | Roland | Mar. 7, 1944 |

FOREIGN PATENTS

| Number | Country | Date |
|---|---|---|
| 518,483 | Germany | Feb. 16, 1931 |